United States Patent
Chen et al.

(10) Patent No.: US 8,370,927 B2
(45) Date of Patent: Feb. 5, 2013

(54) PORTABLE DEVICE WITH PASSWORD VERIFICATION FUNCTION AND SYSTEM HAVING THEREOF

(75) Inventors: Chien-Ming Chen, Hsinchu (TW); Chih-Wen Chen, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 281 days.

(21) Appl. No.: 12/900,493

(22) Filed: Oct. 8, 2010

(65) Prior Publication Data
US 2012/0042377 A1 Feb. 16, 2012

(30) Foreign Application Priority Data
Aug. 10, 2010 (TW) .............................. 99126647 A

(51) Int. Cl.
*G06F 7/04* (2006.01)
(52) U.S. Cl. ......... 726/19; 726/4; 726/5; 726/7; 726/16; 726/17; 726/18; 726/20; 726/21

(58) Field of Classification Search ................. 726/4–5, 726/7, 16–21; 713/182–186
See application file for complete search history.

(56) References Cited

U.S. PATENT DOCUMENTS

| | | | |
|---|---|---|---|
| 2003/0019296 A1* | 1/2003 | Stewart et al. | 73/504.08 |
| 2003/0046554 A1* | 3/2003 | Leydier et al. | 713/186 |
| 2007/0079133 A1* | 4/2007 | Hsieh | 713/182 |
| 2010/0251360 A1* | 9/2010 | Sinclair | 726/19 |

* cited by examiner

*Primary Examiner* — Thanhnga B Truong
(74) *Attorney, Agent, or Firm* — CKC & Partners Co., Ltd.

(57) ABSTRACT

A portable device with password verification function includes several input units, a storage unit and a processing unit. The processing unit is electrically connected with the input units and the storage unit. Each of the input units is different from others. Password information is stored in the storage unit. The processing unit includes a receiving module and a password verification module. The receiving module receives several input signals from the input units respectively. The password verification module verifies if the input signals match the password information.

11 Claims, 1 Drawing Sheet

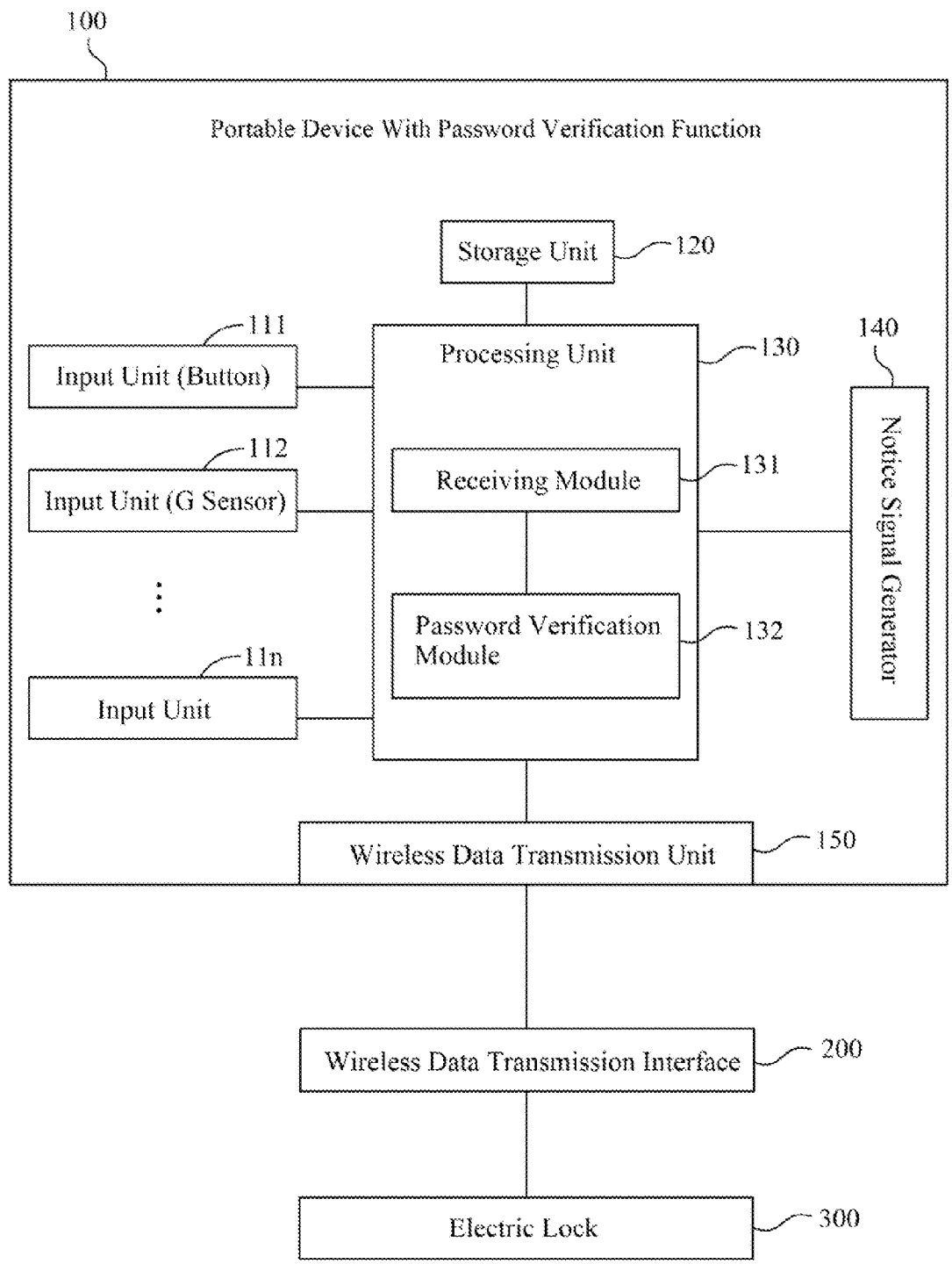

PORTABLE DEVICE WITH PASSWORD VERIFICATION FUNCTION AND SYSTEM HAVING THEREOF

RELATED APPLICATIONS

This application claims priority to Taiwan Application Serial Number 099126647, filed Aug. 10, 2010, which is herein incorporated by reference.

BACKGROUND

1. Technical Field

The present invention relates to a portable device with password verification function and a system having thereof. More particularly, the present invention relates to a portable device with multi-dimension password verification function and a system having thereof.

2. Description of Related Art

Developments in technological design have portable devices lighter, thinner and smaller. Since portable devices are designed to be smaller, they can be easily stolen. Therefore, a password is designed to prevent data stored in portable device from being easily accessed by persons other than owners of portable devices.

In the prior art, single input device of a portable device, such as a keyboard or a touch screen, is utilized for password input, which provides single dimension password. However, complexity of single dimension password is low and stereotyped, which is easy to be cracked and can't impress users.

Therefore, there is a need for new and complicated password design for portable devices.

SUMMARY

According to one embodiment of the disclosure of this invention, a portable device with password verification function is provided. Several different input units are included in the portable device with a password verification function to provide multi-dimension password input. The portable device with password verification function includes several input units, a storage unit and a processing unit. The processing unit is electrically connected with the input units and the storage unit. Each of the input units is different from others. Password information is stored in the storage unit. The processing unit includes a receiving module and a password verification module. The receiving module receives several input signals from the input units respectively. The password verification module verifies if the input signals match the password information.

According to another embodiment of the disclosure of this invention, a system having portable device with password verification function is provided. Several different input units are included in the portable device with password verification function of the system to provide multi-dimension password input. The system having portable device with password verification function includes an electric lock, a wireless data transmission interface and a portable device with password verification function. The portable device with password verification function builds connection with the electric lock through the wireless data transmission interface. The portable device with password verification function includes several input units, a storage unit and a processing unit. The processing unit is electrically connected with the input units and the storage unit. The input units generate several input signals respectively. The input units include a button and a g sensor. When the button is pressed, the button generates a press signal. Wherein, the press signal is taken as one of the input signals. When the g sensor senses that the portable device with password verification function is rotated, the g sensor generates a rotation signal. Wherein, the rotation signal is taken as one of the input signals. There is password information stored in the storage unit. The processing unit includes a receiving module and a password verification module. The receiving module receives the input signals from the input units. The password verification module verifies if the input signals match the password information. When the received input signals comprise the press signal and the rotation signal, the password verification module determines that the input signals match the password information, such that the processing unit transmits an unlock signal to the electric lock through the wireless data transmission interface to unlock the electric lock.

Above all, more input units can be utilized for password input, which increases the dimension number of the password input and therefore provides more complicated password design. In addition, since input units included in the portable device with password verification function is more than one, it's hard for persons other than owner of the portable device with password verification function to know which input units are utilized for password input, which reduces the risk that others crack password set for the portable device with password verification function. In addition, input units of the portable device with password verification function can be used more often. Besides, password input is no longer stereotyped, which can impress users.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows:

FIG. 1 illustrates a block diagram of a system having a portable device with password verification function according to one embodiment of this invention.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a block diagram of a system having a portable device with password verification function according to one embodiment of this invention. Several different input units are included in the portable device with password verification function 100 of the system to provide multi-dimension password input.

The portable device with password verification function 100 includes several input units 111, 112, . . . , 11$n$, a storage unit 120 and a processing unit 130. The processing unit 130 is electrically connected with the input units 111, 112, . . . , 11$n$ and the storage unit 120. Each of the input units 111, 112, . . . , 11$n$ is different from others. Password information is stored in the storage unit 120. The processing unit 130 includes a receiving module 131 and a password verification module 132. The receiving module 131 receives several input signals from the input units 111, 112, . . . , 11n respectively. The password verification module 132 verifies if the input signals match the password information stored in the storage unit 120.

The input units 111, 112, . . . , 11n may include a button 111, a g sensor 112 or other types of input units. When the button 111 is pressed, the button 111 generates a press signal, which is taken as one of the input signals. Wherein, the press signal may be verified as different signals as the button 111 pressed for different time period. The press signal is verified as a long-pressed signal if the receiving module 131 has kept receiving the press signal for more than a pre-defined time. The press signal is verified as a short-pressed signal if the receiving module 131 has not kept receiving the press signal for more than the pre-defined time. Therefore, two different types of input signals (long-pressed signal and short-pressed signal), which are taken as password input, can be generated through a single button 111. Besides, the button 111 may be a multi-stage button, which provide different press signal according to the pressed stage. Therefore, more possible password input combination can be provided.

Besides, the portable device with password verification function 100 may further include a notice signal generator 140, which is electrically connected with the processing unit 130. The notice signal generator 140 may be a speaker, a light or other types of notice signal generator. Therefore, if the receiving module 131 has kept received the press signal for more than the pre-defined time, the processing unit 130 drives the notice signal generator 140 to generate a long-pressed notice signal. Hence, users can realize that the pressed button 111 generates the long-pressed signal when the long-pressed notice signal is generated. Therefore, users can identify that the press signal generated by pressing the button 111 is taken as a long-pressed signal or a short-pressed signal.

The g sensor 112 may sense if the portable device with password verification function 100 is rotated or moved to generate different input signals to be password input. In one embodiment, when the g sensor 112 senses that the portable device with password verification function 100 is rotated, the g sensor 112 generates a rotation signal, which is taken as one of the input signals. The rotation signal may include rotated angle, rotated axis or any other rotation information of the portable device with password verification function 100 sensed by the g sensor 112. The rotated axis may be x, y, z or any other axis of multi-dimension. Therefore, as rotated angle, rotated axis or any other rotation information of the portable device with password verification function 100 differ, different rotation signals can be generated to be password input.

In another embodiment, when the g sensor 112 senses that the portable device with password verification function 100 is moved, the g sensor 112 generates a movement signal, which is taken as one of the input signals. The movement signal may include the distance for which the portable device is moved, the direction in which the device is moved or any other movement information of the portable device with password verification function 100 sensed by the g sensor 112. Therefore, as the distance for which the portable device is moved, the direction in which the device is moved or any other movement information of the portable device with password verification function 100 differ, different movement signals can be generated to be the password input. Operations to different input units 111, 112, . . . , 11n can be combined to provide multi-dimension password input. For example, "short press the button 111", "long press the button 111", "rotated angle of the portable device with password verification function 100", "rotated axis of the portable device with password verification function 100", "moved distance of the portable device with password verification function 100" or "moved direction of the portable device with password verification function 100" can be combined with different combination to be taken as password. In addition, when an input signal is received from one of the input units 111, 112, . . . , 11n, the processing unit 140 may generate a notice signal for next input to notice users. Then, users may input next input signal through one of the input units 111, 112, . . . , 11n. Wherein, it may be verified as wrong password input that next input signal is generated before the notice signal for next input. Therefore, dimension of password input can be increased by combining signals generated by the input units 111, 112, . . . , 11n and the notice signal generator, which can increase password complexity.

The portable device with password verification function 100 can be utilized to unlock electric locks. Hence, the system applying the portable device with password verification function 100 may further include a wireless data transmission interface 200 and an electric lock 300. The portable device with password verification function 100 may further include a wireless data transmission unit 150. The wireless data transmission unit 150 transmits data through the wireless data transmission interface 200. The wireless data transmission interface 200 may be Bluetooth, Infrared Data Association (IrDA) or other wireless data transmission interface. The portable device with password verification function 100 builds connection with the electric lock 300 through the wireless data transmission interface 200. When the received input signals include the press signal and the rotation signal, the password verification module 132 determines that the input signals match the password information. Then, the processing unit 130 transmits an unlock signal to the electric lock 300 through the wireless data transmission interface 200 to unlock the electric lock 300. Hence, if the electric lock 300 is a door lock, users can press the button 111 and rotate the portable device with password verification function 100 to unlock the electric lock 300, which can make users feel like holding and turning a cylindrical lock and therefore make a good impression on users. In other embodiments, operations to other input units may be further combined to provide more complicated password combination, which should not be limited in this disclosure.

Above all, more input units can be utilized for password input, which increases the dimension number of the password input and therefore provides more complicated password design. In addition, since input units included in the portable device with password verification function is more than one, it's hard for persons other than owner of the portable device with password verification function to know which input units are utilized for password input, which reduces the risk that others crack password set for the portable device with password verification function. In addition, input units of the portable device with password verification function can be used more often. Besides, password input is no longer stereotyped, which can impress users.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable device with password verification function comprising:
    a plurality of input units, wherein each of the input units is different from others, wherein the input units comprise a g sensor, wherein the g sensor generates a rotation signal when the g sensor senses that the portable device with password verification function is rotated, and the rotation signal is taken as one of the input signals;
    a storage unit, wherein password information is stored in the storage unit; and
    a processing unit, electrically connected with the input units and the storage unit, wherein the processing unit comprises:
    a receiving module, receiving a plurality of input signals from the input units respectively; and
    a password verification module, verifying if the input signals match the password information.

2. The portable device with password verification function of claim 1, wherein the rotation signal comprises rotated angle or rotated axis of the portable device with password verification function sensed by the g sensor.

3. The portable device with password verification function of claim 1, wherein
    the g sensor generates a movement signal when the g sensor senses that the portable device with password verification function is moved, and the movement signal is taken as one of the input signals.

4. The portable device password verification function of claim 3, wherein the movement signal comprises a distance for which the portable device is moved or a direction in which the device is moved, which is sensed by the g sensor.

5. The portable device with password verification function of claim 1 wherein the input units further comprises:
    a button, wherein the button generates a press signal when the button is pressed, and the press signal is taken as one of the input signals,
    wherein the press signal is verified as a long-pressed signal if the receiving module has kept receiving the press signal for more than a pre-defined time,
    wherein the press signal is verified as a short-pressed signal if the receiving module has not kept receiving the press signal for more than the pre-defined time.

6. The portable device with password verification function of claim 5, further comprising:
    a notice signal generator, electrically connected with the processing unit, wherein the processing unit drives the notice signal generator to generate a long-pressed notice signal if receiving module has kept receiving the press signal for more than the predefined time.

7. The portable device with password verification function of claim 6, wherein the notice signal generator is a speaker, a light or a vibrator.

8. The portable device with password verification function of claim 1, further comprising:
    a notice signal generator, electrically connected with the processing unit, generating a notice signal for next input, such that a next input signal is received from the input units.

9. The portable device with password verification function of claim 8, wherein the notice signal generator is a speaker, a light or a vibrator.

10. The portable device with password verification function of claim 1, further comprising:
    a wireless data transmission unit, electrically connected with the processing unit, wherein the wireless data transmission unit transmits data through a wireless data transmission interface,
    wherein the portable device with password verification function builds connection with an electric lock through the wireless data transmission interface,
    wherein the input units further comprise:
    a button, wherein the button generates a press signal when the button is pressed, the press signal is taken as one of input signals,
    wherein the password verification module determines that the input signals match the password information when the received input signals comprise the press signal and the rotation signal, such that the processing unit transmits an unlock signal to the electric lock to unlock the electric lock.

11. A system having portable device with password verification function, comprising:
    an electric lock;
    a wireless data transmission interface; and
    a portable device with password verification function, building connection with the electric lock through the wireless data transmission interface, wherein the portable device with password verification function comprises:
    a plurality of input units, generating a plurality of input signals respectively, wherein the input units comprise:
    a button, generating a press signal when the button is pressed, wherein the press signal is taken as one of the input signals, and
    a g sensor, generating a rotation signal when the g sensor senses that the portable device with password verification function is rotated, and the rotation signal is taken as one of the input signals;
    a storage unit, wherein password information is stored in the storage unit; and
    a processing unit, electrically connected with the input units and the storage unit, wherein the processing unit comprises:
    a receiving module, receiving the input signals from the input units; and
    a password verification module, verifying if the input signals match the password information, wherein the password verification module determines that the input signals match the password information when the received input signals comprise the press signal and the rotation signal, such that the processing unit transmits an unlock signal to the electric lock through the wireless data transmission interface to unlock the electric lock.

* * * * *